H. Stanley.
Millstone Exhaust.
N°63,325. Patented Mar. 26, 1867.
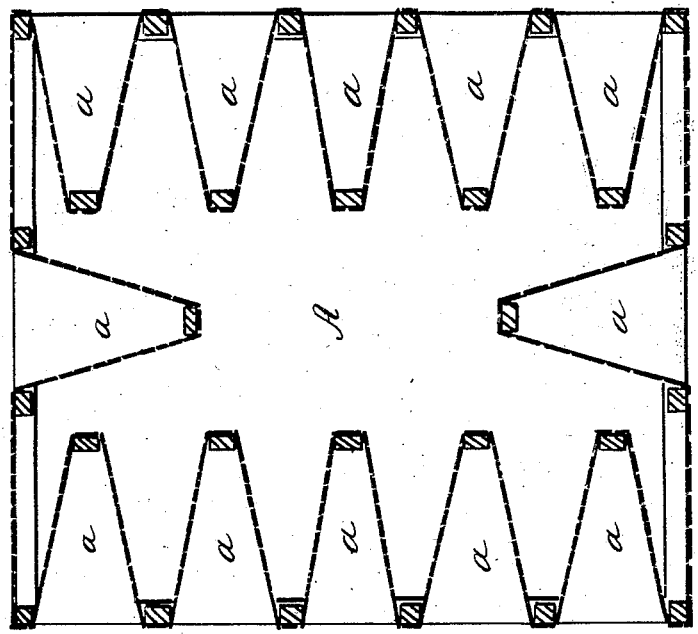
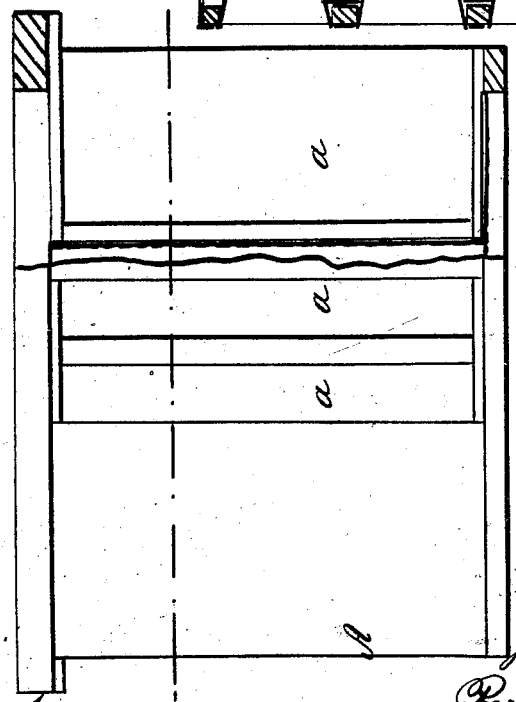
Witnesses;
F. A. Jackson
Alex F. Roberts
Inventor,
Henry Stanley
Per Munn Co
Attorneys

United States Patent Office.

HENRY STANLEY, OF ST. JOHNSBURY, VERMONT.

Letters Patent No. 63,325, dated March 26, 1867.

---

IMPROVEMENT IN RESERVOIRS FOR COOLING GRAIN AND FLOUR.

---

The Schedule referred to in these Letters Patent and making part of the same.

---

TO ALL WHOM IT MAY CONCERN:

Be it known that I, HENRY STANLEY, of St. Johnsbury, Caledonia county, and State of Vermont, have invented a new and useful Improvement in Reservoirs for Cooling Grain and Flour; and I do hereby declare that the following is a full, clear, and exact description thereof, which will enable others skilled in the art to make and use the same, reference being had to the accompanying drawing, forming part of this specification, in which—

Figure 1 is a side view.
Figure 2 is a horizontal section taken in the line $x\ x$.
Similar letters of reference indicate like parts.

This invention consists in an improved mode of constructing a reservoir or air-chamber for cooling flour or grain by exposure to atmospheric air, which is embraced in Letters Patent granted to HENRY STANLEY, of St. Johnsbury, Vermont, No. 40,313, dated the 13th day of October, 1863.

The nature of this improvement consists in so constructing the frame of the air-chamber or reservoir, described and referred to in said Letters Patent by the letters J J J J, that the sides of the frame shall be multiplied and enlarged in their superficies for the purpose of allowing a freer circulation of air therein.

Instead of plain flat sides enclosing the reservoir or air-chamber A, covered with gauze or other porous material, I make zigzag or corrugated sides $a\ a\ a\ a$, the projections extending inward inside of the receiver or reservoir, as shown in fig. 2 of the drawings. By this means the surface of gauze for the air to pass through is greatly enlarged, and made more effectual in cooling the flour, which allows the reservoir to be made much smaller and at less cost.

Having described my improvement, what I claim as new, and desire to secure by Letters Patent, is—

A reservoir for cooling grain or flour, when constructed by placing the posts thereof in zigzag position, and surrounding them with wire gauze or other porous material, thus forming air recesses $a\ a$ upon the outside of the body of the grain or flour, increasing the surface of the grain exposed to the air, substantially as described, and for the purpose specified.

HENRY STANLEY.

Witnesses:
C. C. TOWNSEND,
JOHN PROCTOR.